United States Patent [19]

Moody

[11] Patent Number: 4,648,196
[45] Date of Patent: Mar. 10, 1987

[54] PROTECTED HAND GRIP ASSEMBLY FOR ANGLERS

[76] Inventor: Dale M. Moody, P.O. Box 55389, Tulsa, Okla. 74155

[21] Appl. No.: 798,423

[22] Filed: Nov. 4, 1985

[51] Int. Cl.⁴ .............................................. A01K 87/00
[52] U.S. Cl. ............................................ 43/23; 43/25
[58] Field of Search ................................ 43/22, 23, 25

[56] References Cited

U.S. PATENT DOCUMENTS

| | | | |
|---|---|---|---|
| 1,075,054 | 10/1913 | Morley | 43/23 X |
| 2,826,852 | 3/1958 | Wardrip | 43/23 X |
| 3,295,244 | 1/1967 | Kuntze | 43/22 |

*Primary Examiner*—Nicholas P. Godici
*Assistant Examiner*—Carmine Cuda
*Attorney, Agent, or Firm*—T. D. Copeland

[57] ABSTRACT

A finger protector for the hand grip area of a reel, primarily of the spinning variety. In ordinary usage, a spinning reel is attached to the underside of a bait casting fishing rod by a coupling sleeve for and aft of the saddle of the reel attachment member, and a locking nut binding the sleeves and saddle together, and holding the reel in place on the underside of the rod. The rod and reel are then used for casting in the usual manner, except that the reel attachment arm, which is usually a hard surface rigid metal T shaped structure, is now contoured and cushioned to provide a more efficient and substantially more comfortable hand grip area.

9 Claims, 4 Drawing Figures

PROTECTED HAND GRIP ASSEMBLY FOR ANGLERS

BACKGROUND OF THE INVENTION AND PRIOR ART

The following represent typical patents in this art.

U.S. Pat. No. 718,589, to C. A. Tredwell for Retaining Device for Fish Line Reels, discloses a finger-hold for a casting rod, comprising a thin curved band whose intended purpose is to prevent the fishing line reel from working loose during use by maintaining constant finger pressure on the finger hold.

U.S. Pat. No. 834,571, to T. B. Galbraith for Finger Hook for Fishing Rods, discloses a removable finger-hook that may be used with a casting rod. This product shows a locator for the index finger that may be useful in preventing the rod from slipping from the grasp of the angler when casting.

U.S. Pat. No. 2,482,192, to R. A. MacDonald for Hand Saddle (to be used with casting rods), comprises a rigid shield-like portion curved to conform to a fishing rod and curved to provide a seat to conform to the side of the angler's index finger; it also includes a rigid side rest for the tip of the index finger and means for clamping this saddle to the rod.

SUMMARY OF THE INVENTION

The applicant's device, in contradistinction to the above patents, is so configured as to permit the angler to use his rod and spinning reel in the manner specifically intended by the manufacturer, but absent the discomfort currently experienced in such pursuit.

The propulsion of the fishing lure is accomplished by the exertion of pressure on the reel attachment arm and the rod to which the reel is attached. Such pressure is applied to the rod and reel when the rod tip is approximately 30° (11 o'clock) past vertical, and ceases after it has been propelled through a forward arc and as it reaches slightly forward beyond vertical, by approximately 30° (1 o'clock), during a casting maneuver.

Application of the necessary pressure to complete the forward casting operation is accomplished by the thumb pressing forward and down on top of the rod, and by the third and little fingers pressing backward and up on the underside of the rod and by a third pressure point, which is the concern of this invention, which is where the spinning reel attachment arm or member connects to the underside of the rod.

A considerable amount of pressure is exerted throughout the forward casting arc by the back of the second finger against the attachment arm, which is a narrow hard surfaced rigid metal member, which provides the interconnection between the rod and its attached spinning reel. The fact that this attachment arm is neither contoured nor cushioned causes noticeable user discomfort after a short interval of use, and causes definite pain after a prolonged period of casting.

The front of the user's third finger contacts the shank and is appreciably involved in arresting the forward downward movement of the rod tip through the vertical area of the casting arc, and it also is subjected to substantial discomfort.

Therefore, it is a principal object of this invention to provide at the critical points of contact between the fingers and the shank member, an easily installed finger protector product having a precisely contoured resiliently cushioned contact surface area for the second and third fingers.

It is a further object of this invention to provide an enlarged contact finger protector which will additionally aid and enhance the directional control of, and distance of cast by the casting rod of the angler.

In current practice in the spinning reel and rod casting art, the directional control of the rod is mainly by the lateral exertion of pressure upon the rod by the first (index) and fourth (little) fingers. This invention provides a much wider contact area which allows the second finger to team with the first and allows the third (ring) finger to team with the fourth to enhance the lateral and directional control of the cast.

Due to the presence of a much larger contact area, the second finger is much more able to contribute to the total forward exertion of energy necessary to increase the distance of the cast when desired, which comprises another object of this invention.

Further, the provision of a wider, contoured, and cushioned contact point for the front of the third finger and the back of the second finger will provide complete comfort and pleasure for future generations of anglers.

DESCRIPTION OF THE PREFERRED EMBODIMENT(S)

Figure 1:
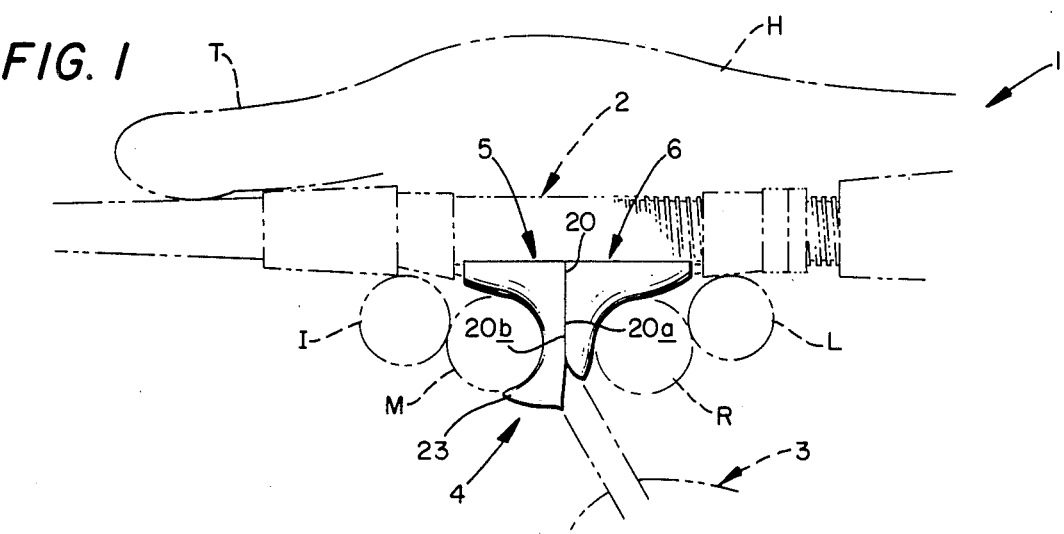
FIG. 1 is a side elevational view of the finger protector element of this invention in its position of attachment to the casting rod and reel.
Figure 2:
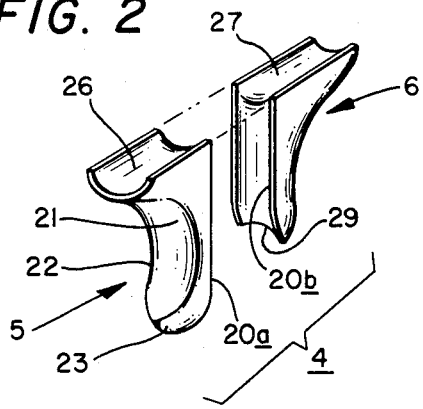
FIG. 2 is an exploded view of the two component parts of one embodiment of this invention, when viewed from the side shown in FIG. 1.
Figure 3:
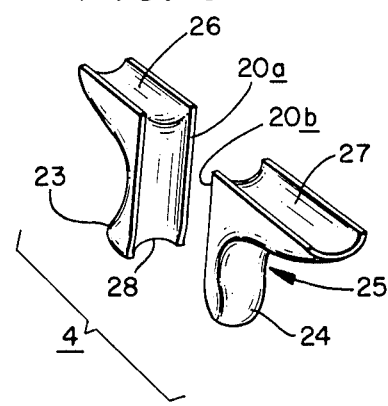
FIG. 3 shows the parts of FIG. 2 from the opposite side from that shown in FIGS. 1 and 2.

Referring now more particularly to the characters of reference in the drawing, it will be observed that the complete protected hand grip assembly for anglers of this invention, 1, actually comprises a combination of the cooperating parts of a casting rod 2, a spinning reel 3, and a finger protector element 4, which may be comprised of two parts 5 and 6. The casting rod 2 is conventional and includes a hand grip handle 7, that joins a threaded portion 8, which receives threaded coupling nut 9, that cooperates with coupling sleeves 10 to bind and hold an elongated saddle member 11, which engages the underside of rod 2 at assembly.

Arm or shank member 15 has a vertical section 16 and an inclined section 17, which respectively terminate in saddle 11 and the balance of spinning reel 3, which is, itself, an available commercial product. Shank member 15 is a hard surfaced rigid element that is not contoured or cushioned and has a semirounded and abrupt elliptical cross section.

FIG. 1 shows the angler's hand "H" in phantom outline to surround the protected hand grip assembly 1 in a manner such that his thumb "T" may apply pressure to the top side of rod 2 and his ring finger "R" and little finger "L" are rearward of the median line 20 of finger protector element 4, and his index finger "I" and middle finger "M" are ahead of the median line 20. All four fingers are employed in gripping the hand grip assembly 1, and the thumb and each finger perform a designated role in the gripping and casting operation.

One embodiment of item 3 is known as "Mitchell Model 304 Spinning Reel", which is incorporated herein by reference.

As previously noted, two of the principal areas of pressure transfer between the angler's hand and the hand grip assembly 1 are the rearward side of the second finger and the forward side of the third finger, and it is these two sides that primarily engage the contoured and cushioned surface of the finger protector element 4.

Figure 4:
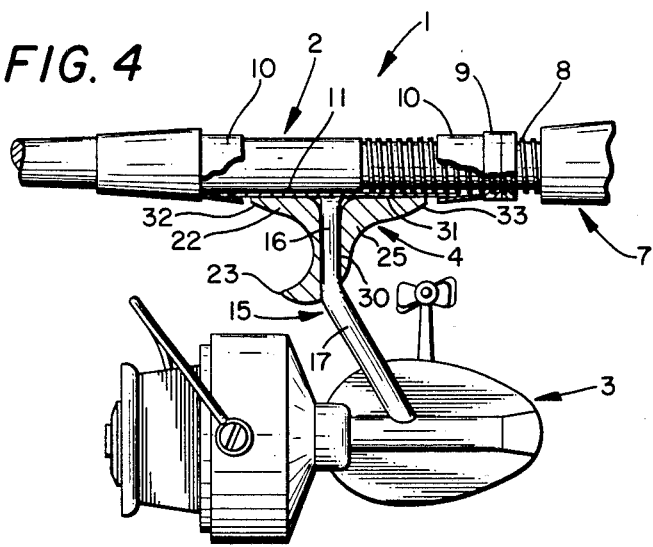
FIG. 4 is a more complete view, partly in section of the protected hand grip assembly, for anglers, of this invention, in the process of its complete assembly.

The forward sector or part 5 of element 4 has a convex external surface 21 that is contoured in a substantially circular arc 22 when viewed in FIGS. 1 and 4, which arc receives the angler's middle finger and terminates in a forwardly projecting tip 23. The rearward sector or part 6 of element 4 also has a convex external surface 24, that is also contoured in an arc 25, but without a corresponding tip 23. This arc 25 accommodates the angler's ring finger and a portion of his fourth finger in the same manner that sector 5 receives a portion of the angler's first finger, all as seen in FIG. 1. Both sectors 5 and 6 have internal concave surfaces 26 and 27 which follow paths 28 and 29 and closely track the external surfaces 30 and 31 of straight shank 16 and saddle 11 when sectors 5 and 6 engage the shank and saddle upon assembly.

Sectors 5 and 6 may be made from any suitable material, for example, rubber, cork, plastic, etc. Even wood has a cushioning effect to the finger protector area of the hand grip assembly. The dimensions of sectors 5 and 6 are such that the forward-most edge 32 and rearward-most edge 33, each terminate just short of engagement with coupling sleeves 10, when the protected hand grip assembly is fully installed and ready for use. At this point, the mating edges 20a and 20b that comprise the median line 20, make contact with each other through a thin layer of glue, or other adhesive or attaching means, that extends over the interior surfaces of both sectors 5 and 6 and directly attaches such surfaces 26 and 27 to their matching areas of shank section 16 and saddle 11.

While there has been described what is considered a preferred embodiment of the present invention, it will be understood by those skilled in the art that various modifications and changes can be made therein without departing from the spirit of this invention as defined by the scope of the appended claims:

What is claimed:

1. A protected hand grip assembly for anglers, comprising in combination:
   a. a casting rod including reel receiving means,
   b. a spinning reel assembly including a reel and a rod engaging saddle inserted in said receiving means,
   c. a shank member between said reel and said saddle, comprising a vertical portion and an inclined portion,
   d. a hand grip area encompassing said rod, said saddle and a portion of said shank member where said shank member engages said saddle, and
   e. a finger protector element in said hand grip area surrounding at least substantially the entire vertical shank portion and a portion of the saddle, and having a cushioned and contoured external surface for accommodating an angler's fingers, whereby the angler's fingers never bear against said shank portion.

2. A protected hand grip assembly as in claim 1, wherein said finger protector element includes a forward projecting top that prevents the angler's middle finger from ever touching said shank.

3. A protected hand grip assembly as in claim 1, wherein said finger protector element includes an internal configured surface to simultaneously engage the contoured surfaces of said shank and saddle.

4. A protected hand grip assembly as in claim 3, wherein said finger protector element comprises initially two separate parts and is held to said shank and saddle by attaching means, and wherein the two separate parts are held to each other by attaching means.

5. A protected hand grip assembly as in claim 3, wherein said finger protector element has a convex external surface after installation on a rod and reel assembly.

6. A protected hand grip assembly as in claim 3, wherein the internal surface of said finger protector element is concave and of the same configuration as the matching surfaces of the rod and reel assembly on which it is installed.

7. A protected hand grip assembly as in claim 1, wherein said finger protector element comprises two separate parts prior to installation, and comprises a single unitary element with said rod and reel assembly after installation.

8. A protected hand grip assembly as in claim 7, wherein said two separate parts are joined by adhesive means along a median line and in a position of engagement with both said saddle and said shank.

9. A protected hand grip assembly as in claim 1, wherein said finger protector element terminates short of engagement with said reel receiving means at both ends of said element.

* * * * *